TEMPERATURE REPORTER ATTACHMENT FOR TELEPHONES

Filed March 20, 1953 2 Sheets-Sheet 1

Inventor
Joseph S. Kropp
By
Walter C. Boggs
AGENT

TEMPERATURE REPORTER ATTACHMENT FOR TELEPHONES

Filed March 20, 1953 2 Sheets-Sheet 2

Inventor
Joseph S. Kropp
By
Walter C. Boggs
AGENT 2,783,302

TEMPERATURE REPORTER ATTACHMENT FOR TELEPHONES

Joseph S. Kropp, Winnipeg, Manitoba, Canada

Application March 20, 1953, Serial No. 343,617

5 Claims. (Cl. 179—5)

The invention relates to a telephone attachment whereby an outside telephone caller will be informed of a change of temperature in the area of the telephone on which the attachment is installed.

The principal object of the invention is to provide a removable attachment for the base portion of a telephone and as a substitute for the ordinary supported receiver normally thereon, and such that if the temperature of the area adjacent the telephone should change a certain amount, the attachment will operate the telephone in the same manner as if the receiver therefor had been lifted therefrom.

A further object of the invention is to provide a manual adjustment on said attachment for varying the temperature at which said telephone will be operated in the manner above described.

Still further objects of the invention are to construct the device in a simple and economical manner, sturdy and reliable, accurate in adjustment, positive in operation, compact for storage when not in use, and such that no constructional alterations are required to the telephone instrument itself.

I attain the above objects by providing a simple casing for telephone attachment, said casing containing a bellows-type of thermostat which, by expansion or contraction with temperature change, will operate a bell crank and release the normally held-down pins of the telephone which are maintaining the telephone inactive with its associated exchange. The details of the invention will now be described, reference being had to the accompanying drawings in which.

In the drawings like characters of reference indicate corresponding parts in the several figures.

Figures 1, 2, 4, 5:
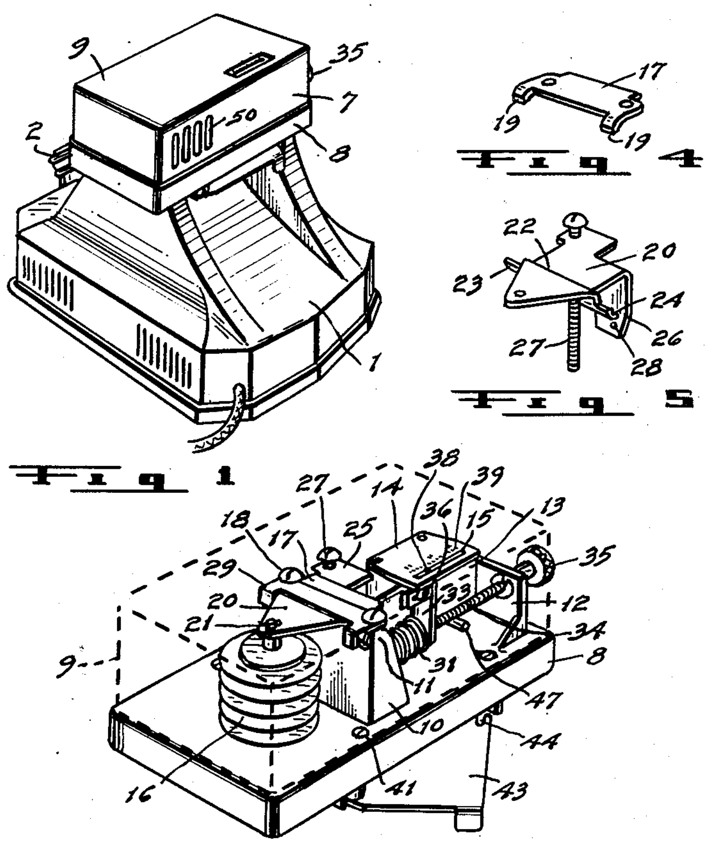
Figure 1 is a perspective view of the base of a business telephone with the invention attached thereto and taking the place of the receiver normally thereon.
Figure 2 is an enlarged perspective view of the attachment with the mechanism exposed and the cover casing indicated in dotted outline.
Figure 4 is a perspective view of the fulcrum plate for the bell crank of the attachment.
Figure 5 is a perspective view of the bell crank and adjustable contact screw.
Figure 3:
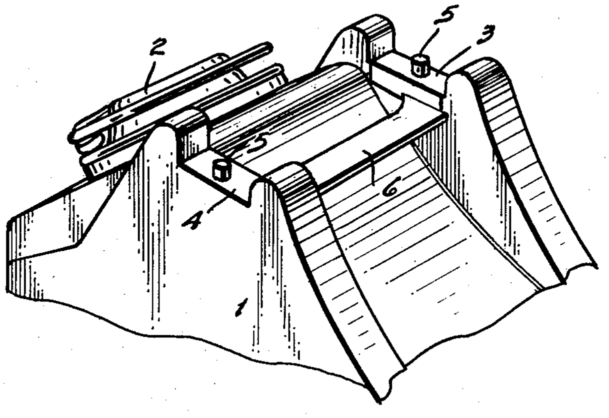
Figure 3 is a perspective view of the upper part of a telephone base ready for receiving the attachment shown in Figure 2.
Figure 6:
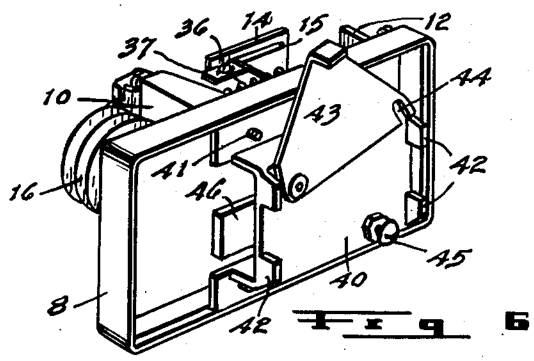
Figure 6 is an inverted perspective view of the attachment shown in Figure 2 and showing the means for locking the same to a telephone.

A telephone is generally indicated by the reference numeral 1 in Figures 1 and 3. The dial of the telephone is shown at 2. The sides of the telephone come up to peaks which are indented to form a pair of spaced saddles

3 and 4 in which the receiver (not shown) normally rests. Pins 5 project up from the central bottom of the saddles and are normally held down by the weight of the receiver just mentioned. The pins pass through metal plates which are connected by a cross strap 6 as a spacer and when one pin moves up or down the other pin makes the same movement as they are connected together within the telephone base.

The telephone temperature reporter, which comprises this invention is indicated at 7 in Figure 1. It presents a base 8 having a cover 9 thereon. The base is provided, inside the cover, with a central standard 10 which forms a kind of partition thereacross with upwardly projecting corners 11 at each end thereof. One end of the base 8 is provided with a short wall 12 which passes into a standard 13 which supports a horizontal, relatively square plate 14 having a slot 15 therein, for a purpose later described.

The opposite end of the base 8 is secured to and supports a bellows-type of thermostat 16 which is formed from circular pleated members in a manner similar to an accordion. The thermostat is filled with a suitable gas so that temperature changes will cause expansion or contraction of the thermostat in the well known manner.

The corners 11 of the standard 10 support a fulcrum plate 17, best shown in Figure 4. This plate is held to the corners by screws 18. Tongues 19, at either end, project downwardly toward the thermostat at approximately 45° angles and with the ends thereof pointed similar to a knife. A lever or bell crank 20, formed from sheet metal and best shown in Figure 5, is adapted to ride on the fulcrum plate. This bell crank has a V-shaped end which is connected at 21 to the upper end of the thermostat 16. It is centrally bent across in a zig-zag at 22 and each side, at this point, is provided with outwardly extending angular positioned lugs 23 having V-shaped slots 24 centrally therealong. The bell crank is received on the fulcrum plate with the knife-pointed tongues 19 seated in the slots 24 so the bell crank can freely rock on the tongues. The rear part of the bell crank terminates in an off-set plate 25 at one side and a downwardly extending arm 26 on the other side. The off-set plate threadedly receives a long vertical adjusting contact screw 27 which is held firm to the off-set plate by a nut 30 and the screw itself passes down through an opening (not shown) in the base 8 to a position therebelow. The bottom of the arm 26 has a hole 28 therethrough. A further light plate 29 covers over the fulcrum plate, is secured by the same screws 18, and the ends of this latter plate has end tongues which project over the fulcrum tongues to prevent bell crank escape therefrom.

A coil spring 31 has one end hooked through the hole 28 of the arm 26 while the spring is tensioned with the other end secured in any manner to a boss 32 at the bottom of a vertical arm 33. A threaded shaft 34 is screwed through the centre of the boss 32 while the opposite end passes through the wall 12 and is exteriorly provided with a finger control knob 35. The vertical arm 33 has the upper end bent at right angles and provided with a set screw 36 which passes through a slot in an adjustable plate 37 to hold same in position. One end of the adjustable plate carries a pointer 38 which passes through the slot 15 of the plate 14 to register with temperature markings 39 thereon. Accordingly, a turning of the finger knob will increase or reduce the tension in the spring 31 while the pointer will move along the slot 15 and register with a different part of the markings 39.

From the above construction it will be seen that the thermostat holds one end of the bell crank up while the coil spring 31 is pulling the opposite end and these two forces maintain the bell crank on the fulcrum plate tongues 19. If the thermostat should contract by a lowering of temperature, the tension of the coil spring 31 will take up the slack, so to speak, and tip the bell crank 20 so that the contact screw 27 will move upward. If the thermostat should expand with an increase in temperature, the contact screw will move downward and the spring 31 will be further tensioned. By manual rotation of the finger knob 35 the spring 31 can be so tensioned that the contact screw 27 will be at a set position when a predetermined temperature of the thermostat is reached.

A trough-shaped plate 40 is secured to the bottom of the base 8 of the reporter by suitable screws 41. The centre of the trough is downward and, at each side, is provided with a pair of downward spaced prongs 42, each pair being adapted to straddle the strap 6 of the telephone base. A triangular-shaped plate 43 has one corner thereof pivoted to the trough-shaped plate 40 so that it can swing under the strap 6 while a slot 44 on the entering corner of the plate 43 can slide onto a screw 45 which is carried by the trough-shaped plate and so anchor the reporter to the telephone base. A Z-shaped lever 46 has one end pivoted at 47 to the base of the reporter, above the trough-shaped plate 40. The centre of this lever is held against the contact screw 27 by a coil spring 48, which connects the lever with the standard 10. The opposite end of the lever holds one of the pins 5 of the telephone down in the same manner as the telephone receiver would (not shown). By the above arrangement, if the temperature of the thermostat should drop as above explained, the contact screw 27 will rise, permitting the lever 46 upward movement, and the pin 5 will be released, and its upward movement will cause the telephone to become active with the exchange.

From the above construction it will be observed that the reporter can be quickly attached to a telephone by removing the normally supported receiver (not shown) and it can be quickly released therefrom in the reverse manner.

When an owner is leaving his premises for a short period of time and they are unprotected, as far as the heating system is concerned, he can attach the reporter to the telephone as described before leaving. At this time the telephone will be inactive in the same manner as if the receiver (not shown) were resting on the saddles 3 and 4. However, if the heating equipment of the building should fail for any reason and the temperature drop, the pins 5 will be released, as above described, and the telephone will become active with its exchange in the same manner as if the receiver had been actually lifted therefrom. The owner, at any time, may call this particular telephone from another telephone, and if the temperature has dropped, he will receive the busy signal and will know that the temperature has dropped below the temperature setting of the reporter. If the temperature has not dropped, he will hear the simulation of the telephone ringing and know that all is well at the premises. It might be possible that the telephone company could provide means for noting this telephone operation without conversation and be able to notify the owner at another telephone and as an extra service to him. In any event, the owner can ascertain himself, at any time, merely by calling this telephone, whether the heating equipment at the called telephone is working satisfactorily.

Figure 7:
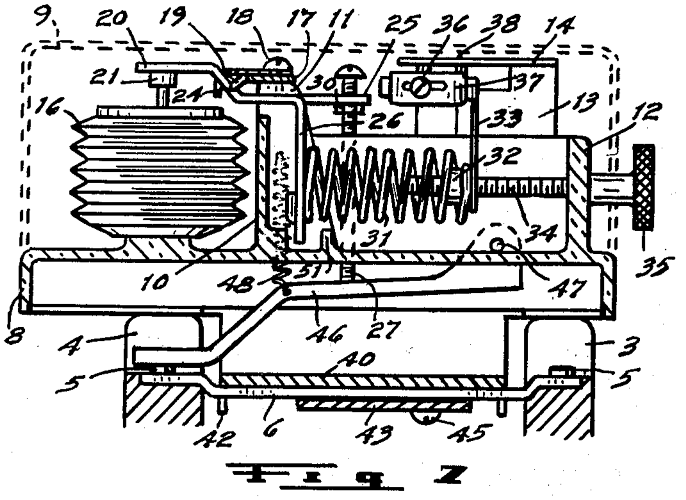
Figure 7 is an enlarged vertical longitudinal section taken through the attachment and the upper part of a telephone to which it is connected.
Figure 8:
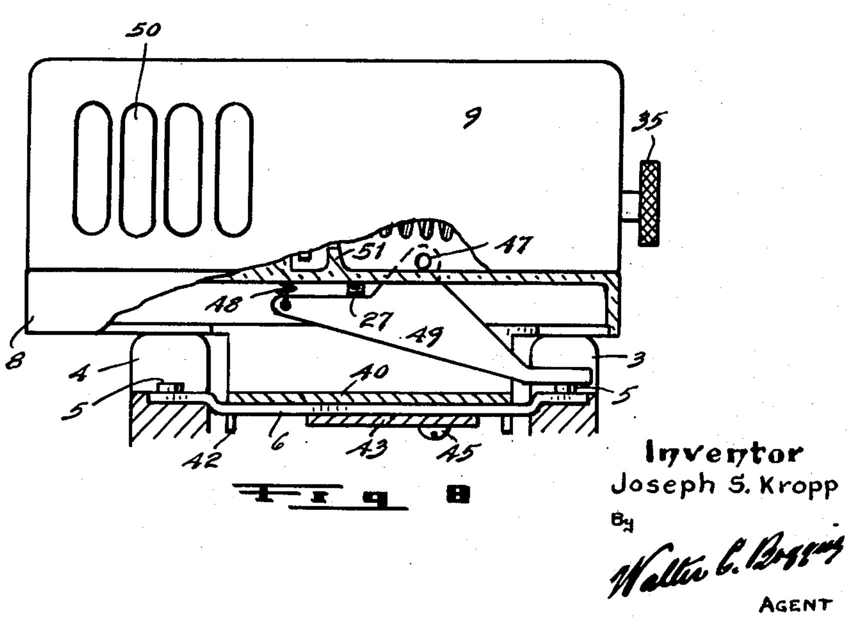
Figure 8 is a similar view to Figure 7, with the cover casing in side view and parts broken away to show a modified method of telephone operation.

The modification shown in Figure 8 is the same as Figure 7 but designed to operate when the temperature rises, such as in a case of fire. All parts are the same with the exception of the pin operating lever 46 which is replaced by a lever 49 which operates the opposite pin 5 of the telephone. When this type of device is attached to the telephone, an increase in temperature at the thermostat will cause the contact screw 27 to move downwardly, thus depressing the lever 49 at the point of contact therewith. As the pin-pressing end of this lever is on the other side of the pivot point 47, that end will rise and release the pins of the telephone to again connect it actively with the exchange. If the owner calls up in the same manner as previously explained he will get the busy signal and know that the temperature has risen above the temperature setting of the reporter and possibly to a dangerous degree. If he hears the simulation of the telephone ring he will know that the heating equipment is operating correctly and that the building is safe from fire.

In order to insure that the reporter will operate fairly quickly, as the surrounding air temperature changes, holes 50 are provided in the casing or cover 9 for free circulation of air to and around the thermostat.

As a further explanation of operation, it is here pointed out that the drawings in Figures 7 and 8 are showing the reporter at operating temperatures. When the reporter is used as a protection against reduction of temperature, the finger knob 35 will regulate the pointer 38 over a temperature marked scale of ten or more degrees below normal, say 40° F. to 60° F. At such operating temperatures any adjustment to increase or decrease the spring tension would noticeably compress or release the thermostat. However, as the normal temperature of a building would be around 70° F., changes in spring tension at such a temperature would have no effect on the thermostat as said thermostat would be holding the arm 26 firmly against the standard 10 with more pressure than the tension in the spring. In the same way, if the reporter were used as a protection against increase of temperature, the spring would be made stronger and the temperature marked scale would read above normal temperature, say 80° F. to 100° F. which would be the critical temperatures at which change of spring tension would be noticeable at the thermostat. However, at a normal temperature of 70° F. the thermostat would be releasing its pressure on the bell crank and the spring would be pulling the arm 26 firmly against the upward projection 51 of the base, so that any adjustment to vary the spring tension would have no effect on the thermostat.

What I claim as my invention is:

1. A temperature change reporter for use with a telephone, comprising: a base removably securable to said telephone; a temperature expansible and retractable thermostat mounted on said base; a pivoted lever mounted on the base and operable by the thermostat; a manually adjustable spring operable to resiliently restrain the movement of said lever in one direction and to assist its movement in the opposite direction; and movable means, carried by the reporter, normally positioned to hold the telephone audibly disconnected from its associated exchange, when the reporter is secured thereto, and movable by the thermostat to release the telephone for audible connection thereof to said exchange.

2. A temperature change reporter, comprising: a base removably securable to a telephone; a temperature expansible and retractable thermostat mounted on said base; a bell crank pivotally mounted on said base with one end thereof operable by the thermostat; a manually adjustable spring operable to resiliently restrain the movement of the opposite end of said bell crank in one direction and assist movement in the opposite direction; means carried by the bell crank and normally positioned to hold said telephone audibly disconnected from its associated exchange, when the reporter is secured thereto, and operable by movement of said bell crank to release the telephone for audible connection thereof to said exchange.

3. A telephone change reporter, comprising: a base member having means thereon to removably secure same to a telephone; a temperature expansible and retractable bellows mounted on said base member; a bell crank pivotally mounted on said base member with one crank end thereof co-actable with the bellows for rocking movement of said bell crank thereby; the opposite bell crank end resiliently controllable by one end of a coil spring; the opposite end of said coil spring secured to a central threaded boss; a control screw rotatably supported by the base member and threaded through said boss for varying the resiliency of said spring in its rotation; means carried by the bell crank and normally positioned to hold the telephone audibly disconnected from its associated exchange, when said reporter is secured thereto, and operable by movement of the bell crank to release the telephone for audible connection thereof to said exchange.

4. A temperature change reporter, comprising: a base member having means thereon to removably secure same to a telephone; a temperature expansible and retractable bellows mounted on the base member; a bell crank pivotally mounted on the base member with one crank end thereof co-actable with the bellows for rocking movement of said bell crank thereby; a manually adjustable spring operable to resiliently restrain the movement of the opposite end of said bell crank in one direction and assist its movement in the opposite direction; a plate arm carried by said bell crank and rockable therewith; adjustable contact means carried by the arm; a lever pivotally mounted on the base member and contactable by said adjustable means to normally hold down a conventional pin of the telephone which is normally held down by its cradle, when said reporter is secured thereto; and said adjustable means rockable with said plate arm to release said lever and said pin.

5. A temperature change reporter, comprising: a base member removably securable to a telephone; a temperature expansible and retractable bellows mounted on the base member; a bell crank fulcrummed on the base member with one crank end thereof movable by the bellows in its movement; the opposite bell crank end secured to one end of a tensioned coil spring; the opposite end of the coil spring carrying a central threaded boss; a manual control member bearinged in the base member and threaded through said boss for varying the tension of said spring, when rotated; a plate arm carried by the bell crank and rockable therewith; an adjusting screw threaded through said plate arm; a lever pivoted to the base member and contactable by said adjusting screw to normally hold down the conventional pin of a telephone which operates the exchange connecting switch thereof, when the reporter is secured thereto; and said adjusting screw rockable with said plate arm to release said lever and said pin.

References Cited in the file of this patent

UNITED STATES PATENTS

| | | |
|---|---|---|
| 1,838,144 | Holmes | Dec. 29, 1931 |
| 2,124,488 | Grondahl | July 19, 1938 |
| 2,478,514 | Townley | Aug. 9, 1949 |